(12) United States Patent
Varner et al.

(10) Patent No.: US 8,496,860 B2
(45) Date of Patent: Jul. 30, 2013

(54) FOAM-BACKED, HOLLOW ARTICLES MADE BY COLD ROTATIONAL MOLDING

(75) Inventors: Richard Varner, Longmont, CO (US); Derek Johnson, Golden, CO (US)

(73) Assignee: Fusion Specialties, Inc., Broomfield, CO (US)

( * ) Notice: Subject to any disclaimer, the term of this patent is extended or adjusted under 35 U.S.C. 154(b) by 309 days.

(21) Appl. No.: 12/847,336

(22) Filed: Jul. 30, 2010

(65) Prior Publication Data

US 2011/0024031 A1    Feb. 3, 2011

Related U.S. Application Data

(60) Provisional application No. 61/230,179, filed on Jul. 31, 2009.

(51) Int. Cl.
*B28B 1/02* (2006.01)
(52) U.S. Cl.
USPC .......................................... 264/45.7; 264/310
(58) Field of Classification Search
USPC ................................................. 264/45.7, 310
See application file for complete search history.

(56) References Cited

U.S. PATENT DOCUMENTS

| | | | |
|---|---|---|---|
| 3,655,861 A | 4/1972 | Roberts | |
| 3,933,692 A | 1/1976 | Kushlefsky et al. | |
| 4,021,385 A | 5/1977 | Austin et al. | |
| 4,297,472 A | 10/1981 | Heiss | |
| 4,367,307 A | 1/1983 | Hirai et al. | |
| 4,383,079 A | 5/1983 | Gasper et al. | |
| 4,638,016 A | 1/1987 | Arai et al. | |
| 4,721,531 A | 1/1988 | Wildeman et al. | |
| 4,743,626 A | 5/1988 | Narayan | |
| 4,798,317 A | 1/1989 | Lonczak | |
| 4,836,963 A * | 6/1989 | Gilman, Jr. | 264/45.7 |
| 5,002,475 A | 3/1991 | Graefe | |
| 5,064,870 A | 11/1991 | Kollmeier et al. | |
| 5,156,762 A | 10/1992 | Suhoza et al. | |
| 5,208,368 A | 5/1993 | Scherzer et al. | |
| 5,310,099 A | 5/1994 | Claas | |
| 5,409,150 A | 4/1995 | Tranquilli | |
| 5,476,892 A | 12/1995 | Scholl et al. | |
| 5,994,579 A | 11/1999 | Torrel et al. | |
| 5,998,532 A | 12/1999 | Urs | |

(Continued)

FOREIGN PATENT DOCUMENTS

JP    59188412    10/1984
WO   WO02089092  11/2002

*Primary Examiner* — Christina Johnson
*Assistant Examiner* — Patrick Butler
(74) *Attorney, Agent, or Firm* — e winner & associates, pllc

(57) ABSTRACT

Systems and cold rotational molding methods are provided for making hollow, foam-backed polymeric molded articles. The molded articles can be manikins or manikin parts, or other articles, such as frames (e.g. for mirrors and pictures), urns, fixtures, furniture, display props, and garden furniture, made of a thermosetting elastomeric material. The articles are more structurally rigid than previous molded articles utilizing the same amount of polymer material, lighter in weight than previous molded articles having the same structural rigidity, and more resistant to deformation under temperatures up to 180 to 185° F. The process of making a molded manikin part, from the first injection of polymer into the mold until demolding of the finished part, can be completed in as short a time as 18 minutes without the necessity for cradling of the demolded part, even when the part requires one or more flat surfaces.

21 Claims, 4 Drawing Sheets

U.S. PATENT DOCUMENTS

| | | |
|---|---|---|
| 6,109,921 A | 8/2000 | Yau |
| 6,147,181 A | 11/2000 | Michels et al. |
| 6,187,514 B1 | 2/2001 | Kiyosawa et al. |
| 6,200,233 B1 | 3/2001 | Moody |
| 6,290,614 B1 | 9/2001 | Kennedy et al. |
| 6,352,485 B1 | 3/2002 | Philpot et al. |
| 6,362,485 B1 | 3/2002 | Joyce et al. |
| 6,395,797 B2 | 5/2002 | Ragsdale et al. |
| 6,464,908 B1 | 10/2002 | Friend et al. |
| 6,494,543 B1 | 12/2002 | Hashimura et al. |
| 6,555,037 B1 * | 4/2003 | Payne ................. 264/40.7 |
| 6,705,794 B2 | 3/2004 | Varner et al. |
| 6,716,384 B2 | 4/2004 | Rusche |
| 7,144,179 B2 | 12/2006 | Varner et al. |
| 7,325,996 B2 | 2/2008 | Varner et al. |
| 2003/0006526 A1 | 1/2003 | Talaric et al. |
| 2004/0075194 A1 * | 4/2004 | Danzik ................. 264/310 |
| 2005/0040563 A1 | 2/2005 | Lang et al. |
| 2005/0184422 A1 | 8/2005 | Talaric et al. |
| 2008/0089739 A1 | 4/2008 | Varner et al. |

* cited by examiner

FOAM-BACKED, HOLLOW ARTICLES MADE BY COLD ROTATIONAL MOLDING

CROSS-REFERENCE TO RELATED APPLICATIONS

This application claims the benefit of U.S. provisional application Ser. No. 61/230,179, filed Jul. 31, 2009 which is incorporated by reference herein in its entirety.

BACKGROUND

Forms (also known as manikins) for display of clothing have traditionally been molded from plaster, or fashioned from sheets of rubberized acrylic material (U.S. Pat. No. 5,310,099), other plastic (U.S. Pat. No. 4,798,317), or cardboard or other sheet-like material (U.S. Pat. No. 5,409,150). Molded forms are taught in U.S. Pat. No. 5,310,099.

Methods of molding using elastomeric materials are known to the art. Such methods include those disclosed in U.S. Pat. No. 5,064,870, disclosing a method for producing highly elastic cold-curing polyurethane foams, U.S. Pat. No. 4,383,079 dealing with extension of polyurethane cure time, U.S. Pat. No. 3,933,692, and U.S. Pat. No. 4,638,016, dealing with catalysts useful in such processes, and U.S. Pat. Nos. 4,297,472, 5,208,368, 4,721,531, 5,994,579, 5,476,892, 5,156,762, 4,021,385, 4,743,626, and 5,998,532, which deal with coloring or stabilizing the color of polyurethane materials. U.S. Pat. Nos. 6,109,921 and 6,395,797 deal with polyurethane foams. U.S. Pat. Nos. 6,187,514 and 6,362,485 deal with hollow molded objects.

Rotational molding methods are disclosed in U.S. Patent Publication Nos. 2003/0006526, 2005/0184422, and 2005/0040563, U.S. Pat. Nos. 6,716,384, 6,555,037, and 6,109,921, and Japanese Patent Publication 59188412.

Other patents dealing with polyurethane molding processes are U.S. Pat. Nos. 3,655,861, 4,367307, 4,798,317, 5,002,475, 5,310,099, 5,409,150, 6,147/181, 6,176,384, 6,200,233, 6,290,614, 6,494,543, 6,352,485, and 6,464,908.

However, none of these patents or publications disclose or suggest a foam-backed manikin made by cold rotational molding that resists deformation at temperatures up to 185° F. or resists cracking when struck by a hammer at impacts forces of about 50- to about 55 joules.

All publications identified herein are incorporated herein by reference to the extent not inconsistent herewith for purposes of written description and enablement.

SUMMARY

Systems and cold rotational molding methods are provided for making hollow, foam-backed polymeric molded articles. The molded articles can be manikins or manikin parts, or other articles made of a thermosetting elastomeric material, such as frames (e.g. for mirrors and pictures), urns, fixtures, furniture, display props, and garden furniture. The articles are more structurally rigid than previous molded articles utilizing the same amount of polymer material are lighter in weight than previous molded articles having the same structural rigidity, and more resistant to deformation under temperatures up to 170, or 180 or 185° F. There is no need for a metal armature inside the manikin to provide support for the outer walls. The process of making a molded manikin part, from the first injection of polymer into the mold until demolding of the finished part, can be completed in as short a time as 18 minutes without the necessity for cradling of the demoded part, even when the part requires one or more flat outer surfaces. In previous processes, flat surfaces of hollow, molded articles demolded after about 18 minutes in the mold were prone to distortion due to gravity after demolding, and required cradling to prevent distortion, i.e., placing the demoded article on or in a support having contours fitting those of the molded article until the walls were completely cured. The molded articles are made by a process of cold rotational molding (rather than a melted thermoplastic rotational molding process), at room temperature.

Provided herein is a method for making a hollow molded article that is resistant to heat and impact distortion, said method comprising:

a. introducing a first polymer mix containing uncured polymer components for a rigid, hollow polymer shell into a mold in an amount sufficient to form a shell coating of said first mix on the inside surface of the mold;

b. rocking and rotating the mold in multiple directions to form said shell coating until at least the inner surface of said coating has become tacky enough to stick to a second polymer mix containing uncured polymer components for a rigid polymer foam backing;

c. introducing said second mix into the mold in an amount sufficient to form a foam coating on said shell coating;

d. rocking and rotating the mold in multiple directions to form said foam coating and allow said shell coating to cure sufficiently that the molded article can be removed from the mold; and e. removing the molded article from the mold;

wherein the molded article is capable of resisting deformation under load at temperatures up to at least about 170° F., and in embodiments, at temperatures up to about 180 or 185° F.

The molded article is also capable of resisting cracking when struck with a 10-pound hammer moving at about 10 meters per second, which is estimated to provide an impact force of more than about 50-55 joules. Without the foam backing, the shell would crack.

In embodiments, the mold is sized and shaped to produce a molded article having the size and shape of a normal human body or human body part.

In embodiments, said first polymer mix, for said rigid shell, is introduced into said mold in an amount at least sufficient to form a coating about ⅛ inch to about ¼ inch thick on the inner surface of said mold. In embodiments, said second mix, for said foam coating, is introduced into said mold in an amount at least sufficient to form a coating about ⅜ inch to about ¾ inch thick on the inner surface of said shell. In embodiments, the coatings are substantially uniform in thickness over their larger areas; however, may be deliberately made thicker where extra reinforcement is needed, e.g., in manikin legs. Generally about 95% to 98% of the foam coating is within the range of about ⅜ inch to about ¾ inch thick. It will be understood by those of skill in the art that ridges on the interior surface of the mold may cause the coating to be thinner, while valleys may cause it to be thicker. Greater thickness can also occur in areas such as manikin fingers, where there is not enough room inside the mold to provide the required coating thicknesses and still leave a hollow space between the walls. In addition, turbulence patterns can induce areas of greater thickness. Typically, the areas of greater thickness will not exceed about 2 inches in thickness.

The method is performed at a temperature within the mold sufficient to maintain the first and second polymer mix at viscosities low enough to form said coatings, but not too low to prevent the mix from flowing well enough to coat the inner surface of the mold. Typically this temperature will be between about 105 and about 115° F.

The method can be completed in at most about 18 minutes from introduction of the first polymer mix until the molded article is ready for demolding.

In embodiments, the uncured polymer mixes for the shell and foam backing both comprise polyurethane, and the first and second uncured polymer mixes both comprise polyol or polyester resin, isocyanate, and a curing catalyst. The uncured polymer mixes can also comprise pigments or dyes effective to produce a desired color for the shell and/or polymer foam backing. The polymer mix for the shell is one that provides good handling characteristics and properties for the molded article, e.g., as described in US Patent Publication No. 2003/0006526, incorporated herein by reference. In embodiments, the first mix, for the polymer shell, has an isocyanate to polyol ratio of about 77:100. In embodiments, the second mix, for the rigid polymer foam backing, has an isocyanate to polyol ratio of about 100:82 to about 100:92, and in a specific embodiment, 100:87. The isocyanate to polyol ratio is selected so as to provide a reaction that produces a desirable flow time as further described below. The slower the reaction, the longer the period during which the mix will stay liquid enough to flow. The isocyanate to polyol ratio, along with the polymer components and other system parameters are selected so as to produce the desired amount of foam in the desired amount of time using principles known to the art and taught herein.

The uncured polymer components for the foam backing and/or for the shell can also comprise other additives known to the art, including pigments or dyes effective to produce a desired color in the foam backing and shell respectively.

In embodiments, the mold comprises complex curved surfaces. Examples are molds for manikins and manikin parts. In embodiments, the mold also comprises at least one flat surface, and in embodiments, the method of making the molded article also comprises attaching a magnetic component to a flat surface of the molded article.

In embodiments, the mold can also comprise one or more foam buildup-inducing components which will produce turbulence in the second polymer mix (for the rigid polymer foam backing) as the mold is rotated and cause a buildup of the foam on internal structures in the mold. This will produce a molded article comprising areas having greater than average foam thickness produced by the turbulence induced by the foam buildup-inducing component(s).

In embodiments, neither the mold nor the molded article comprise an internal armature, i.e., a support structure. Many conventional manikins require internal armatures made of metal or other strong, rigid material, to support the manikin in an upright position. This adds to the weight of the manikin. An advantage of the present method is that it allows the making of manikins and other molded articles that do not require such armatures. The rigid foam backing provided herein, while performing the function of providing internal support for the molded article, is not considered an "armature" herein.

When the method of making the molded article includes the use of a foam buildup-inducing component, such as a metal strap disposed in the leg of a manikin, to cause a greater buildup of rigid foam material in the vicinity of the foam buildup-inducing component, the metal strap or other such component can be left in the manikin after demolding. Embodiments provided herein include molded articles having no internal support structures other than such foam buildup-inducing components, which are not considered "armatures" herein.

In embodiments, the molded article comprises attachment means for affixing it to another structure. For example, a manikin may contain a rigid component, which may be made of metal or other rigid material, for attaching it to a stand, such as a tube into which the shaft of a stand can be inserted. Embodiments provided herein include molded articles having no internal support structures or armatures other than such attachment means.

The method provided herein can also comprise forming one or more holes in the molded articles, such as a vent hole or holes for attaching other components, such as magnetic fittings, to the molded article.

The methods provided herein can produce manikins in the form of humans or other animals that are full-sized or larger or smaller than natural size. In embodiments, manikin bodies are produced having limbs and parts that are magnetically attachable to the bodies, e.g., as described in U.S. Pat. Nos. 6,705,794, 7,144,179, and 7,325,996.

As used herein, "room temperature" means about 65 to about 75° F.

The outer shell and the foam backing are, in embodiments, made of similar polymers, particularly those that have similar properties including similar coefficients of expansion when exposed to heat, so that the shell and foam backing will expand and contract at the same rate. This will ensure good bonding between the shell and foam backing. In an embodiment both the shell and foam backing are made of thermosetting polyurethane. Other thermosetting polymers can also be used. In a two-component system such as a urethane system, using an isocyanate and polyol component, the physical properties of the material can be adjusted by changing the type and/or amount of polyol or polyester and isocyanate components in accordance with the principles and the use of various additives as taught herein and/or as known to the art. For example, although fillers can be added to the uncured polymer mix for the shell component, fillers that prevent foaming should not be used in the uncured polymer mix for the foam backing. Any suitable foam polymer mix can be used that is compatible with the polymer mix used for the shell. In an embodiment, the rigid foam backing is a water-blown foam, and the uncured polymer mix for the foam is caused to foam when water is added. In embodiments, the polymer mix for the shell is not water based and contains a polyol component that is not water soluble. The polymer mixes can also contain other components such as curing catalysts.

The term "rigid" as used herein means that the material does not easily deform under load. The standard test is ASTM D 648-98, Deflection Temperature Under Load (DTUL), which determines the temperature at which deformation of the material occurs under a controlled set of conditions. A score of a higher temperature indicates that the material remains rigid even at elevated temperatures. A lower temperature score indicates that the material is more rubbery and easily deformed. The outer shell of the molded articles hereof has a DTUL score of between about 135° F. and about 185° F. or more, in embodiments between about 140° F. and about 175° F. or about 180° F. The inner foam backing has similar DTUL scores within these temperature ranges.

The term "shell" as used herein means an outer portion of a molded article that has a thickness within selected limits. In embodiments the thickness of the shell is substantially uniformly between about ⅛ and about ¼ inch, which means it can vary between the selected limits of about ⅛ to ¼ inch, optionally with some local areas of foam buildup due to turbulence or features such as ridges, valleys, and narrow pockets in the mold. In embodiments, about 95% to about 98% of the shell is between about ⅛ inch and ¼ inch thick. In embodiments, substantially all of the inside surface of the mold is coated with the uncured polymer shell components, leaving a void volume in the interior of the shell. In embodiments, the shell defines a substantially closed volume. A "substantially closed volume" is one that can have holes for attaching hardware such as screws, bolts, pins and other hardware components, or for venting of air, or adding material to the interior of the shell, but in which the holes make up a very small percentage, e.g., 0.25% or less of the shell surface. The molded article having such holes can be made by drilling or cutting the holes after demolding the molded article, or by other means known to the art such as molding the article while a straw or other object placed in or on the inside of the mold forms the hole. The mold can be partially or substantially closed as well; that is, it can enclose a "substantially closed volume" as defined above, or can be partially closed, so long as it is shaped so as to allow coating of its inner surface by polymer material by rocking or rotating without significant loss of polymer material.

In embodiments hereof, the mold comprises a complex curved surface, meaning that the surface has bumps and hollows in a non-regular pattern, for example as found on the surface of a human or animal body. In embodiments, a portion or portions of the mold can be flat, for example as required for producing a flat surface on a body part such as an upper arm that is part of an arm or shoulder of a manikin. Such flat surfaces can be used for attaching magnetic components to the finished molded article so that limbs of a manikin can be magnetically attached. See, e.g., U.S. Pat. Nos. 6,705,794; 7,144,179; and 7,325,996, as well as U.S. Patent Publication No. 20080089739, incorporated herein by reference.

In previous methods for producing molded articles with flat surfaces by rotational molding using exothermic processes such as those using polyurethane materials, it has been necessary to leave the molded article in the mold until it is completely cured to avoid deformation of the flat surface. However, surprisingly, it has been found that the use of the foam backing material herein pushes the polymer shell against the flat surface of the mold and prevents deformation, so that the article can be demolded after only about 18 minutes. Demolding immediately is recommended, as when the article is completely cured, it may be difficult to remove from the mold.

In an embodiment, the uncured polymer components for making the shell in an amount sufficient to coat the interior of the mold to about ⅛ to ¼ inch are flowed into the mold. The mold is rocked and rotated by means known to the art. Biaxial or multiaxial rotation can be used, which means the mold can be simultaneously rocked and tipped in different directions. Rocking and rotating is continued until the inner surface of the mold is substantially uniformly coated with the uncured polymer material used to produce the shell to a depth of about ⅛ to ¼ inch, and is continued until the inner layer of the shell has gelled so as to become tacky enough to stick to the subsequently added foam components. Typically, this occurs after about 7 minutes. The rotation and rocking is typically stopped at this point and in embodiments, any plug of shell polymer material that has formed in the inlet of the mold is removed while it is still soft, and then uncured polymer components for the rigid polymer foam backing are inserted into the hollow shell that has formed inside the mold in an amount sufficient to coat the interior of the mold to about ⅜ to about ¾ inch of foam. The mold is then immediately rocked and rotated for about 6 to 10 minutes while the foam layer is forming, and while the outer shell continues to cure. The heat from the exothermic curing reaction of the foam helps cure the shell. Depending on the polymer mixes used, this additional heat from the foam-curing reaction may help to cure the shell so that it can be removed in a short time, e.g., after only about 18 minutes. When the outer shell has cured enough for the molded article to be demolded, the molded article is taken out of the mold. In an embodiment, the uncured polymer mix for the foam backing comprises an isocyanate to polyol ratio of about 100:82 to about 100:92, e.g., about 100:87, and has a density of about 8-12 pounds per cubic foot. This polymer mix for the foam also comprises a blowing agent known to the art, such as water or halocarbons.

The molded article can be machined or cut to provide attachment points for necessary hardware. When a completely closed hollow molded article is produced at one altitude and used at another altitude, a vent hole should be provided. For example, when a closed manikin is produced at high altitude in the Rocky Mountain West for use at low altitude, such as in coastal cities, the vent hole allows air to flow in when the article is taken to lower altitude where the higher ambient pressure would otherwise cause the molded article to collapse inward or shrink. Similarly, when the molded article is made at low altitude for use at high altitude, air can flow out through the vent hole as it expands rather than causing the closed molded article to explode or crack. The methods described herein can also include removing unwanted protuberances and seams (flash) from the demolded article.

Manikins can be fabricated by molding various parts, such as torsos, heads, and limbs by the methods described herein, and attaching the parts to each other to form a finished manikin. In embodiments, the parts are attached by magnetic fittings.

Figure 1:
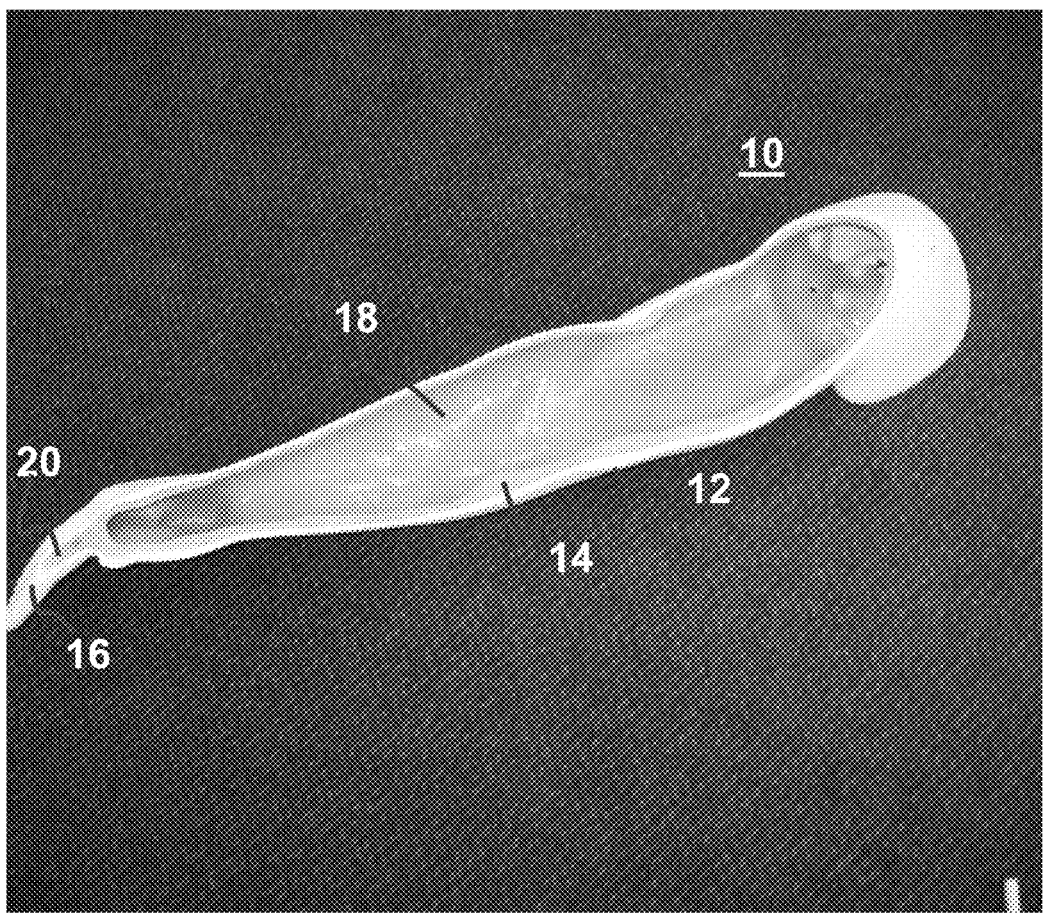
FIG. 1 is a perspective cutaway view of a molded manikin arm hereof showing the rigid outer polymer shell and rigid foam backing layer.

Exemplary embodiments are illustrated in referenced figures of the drawings. It is intended that the embodiments and figures disclosed herein are to be considered illustrative rather than limiting.

DETAILED DESCRIPTION OF THE INVENTION

The following embodiments and aspects thereof are described and illustrated in conjunction with systems, tools and methods which are meant to be exemplary and illustrative, not limiting in scope.

The display forms and other molded articles made by the methods described herein are, in embodiments, made using a cold rotational molding process at room temperature. In embodiments, the process is conducted at a mold temperature of between about 105-115° F. The mold temperature is controlled by heat exchange elements in the mold as is known to the art.

The molded articles comprise a rigid outer polymer shell and an inner rigid polymer foam backing layer. The viscosity of the polymer mix components for each layer is controlled so that these layers are bonded together and do not readily peel apart. These molded articles, including the outer shell and the foam backing, are hollow, i.e., have a void volume inside. The outer shell has a substantially uniform thickness between about ⅛ and about ¼ inch, and the inner foam backing has a substantially uniform thickness between about ⅜ inch and about ¾ inch.

In embodiments, the forms or other molded articles made by the methods described herein have a matte finish. The forms as molded can have a selected uniform color throughout the thickness of the outer shell. Any desirable color can be selected, e.g., skin color (to approximate that of any race) grey, tan, red, blue, yellow, metallic colors such as gold and silver, and mixtures thereof. White and black molded articles are also provided herein. The foam backing can also be colored. In embodiments, white pigment is included in the polymer mixes for both the shell and the foam. Coatings and finishes can be applied to the surface if desired. The forms can also be molded with a glossy finish when desired.

The Molds

Molds for polyurethane materials are known to the art. The cold rotational molding process used herein allows epoxy molds to be used. The fiber-reinforced epoxy molds used herein are, in embodiments, made of high-temperature epoxy resins having an aluminum-filled face coating on the inner surface 0.003 to 0.005 inches in thickness covered with a resin and fiberglass buildup to about ⅜ inch. Metal molds such as stainless steel or aluminum molds can also be used, but are more expensive and require more heat to process the material properly. Epoxy molds are poor conductors of heat and therefore do not require an external heating source to maintain the desired temperature. The exothermic urethane reaction within the mold is generally sufficient to maintain the desired temperature.

The inside surface of the mold can be textured when the mold is manufactured, or the inside surface can be treated after manufacture, such as by sandblasting, bead blasting, etching, hand sanding or other means known to the art, to provide a desirable surface texture to the molded article.

The mold can be treated with conventional release agents to facilitate demolding and prevent the cured material from sticking to the interior mold surfaces.

The Rigid Polymer Shell

In an embodiment, polyurethane materials are used for both the outer shell and the inner foam backing. Polyurethane molding is well known to the art. Polyurethanes are produced by a chemical reaction between polyols or polyesters and isocyanates. Generally, molding methods use two liquid components designated in the industry as component (A), the isocyanate component, and component (B), the resin component. The resin component (B) generally contains the backbone of polyether or polyester, chain extender, catalyst and flow control agent. Pigment and/or dyes and dispersions thereof also can be included in or added to component (B) prior to the reaction with the isocyanate (component (A)). The coloring agent must be compatible with the resin component (B) so that the color will be uniformly dispersed in component (B). If the pigment or dye is not compatible with component (B), then settling of the pigment and clogging of filter can result. U.S. Pat. No. 4,721,531, incorporated herein by reference, discloses methods for incorporating pigment into such mixes along with ultraviolet light-stabilizing compounds and heat stabilizers to provide uniform dispersion. As used herein, dyes are soluble in the mix, while pigments may or may not be soluble.

Urethanes can be prepared by a "one-shot" method in which diisocyanate, polyol or polyester, chain extender, catalyst and any additives are combined in a single step followed by casting of the elastomer. However, in embodiments, the method of preparation of urethanes in the present process employs prepolymers ("A" side equivalents) generated by the reaction of the astoichiometric excess of isocyanate, e.g., methylene diphenyl diisocyanate (MDI), with the chosen polyol or polyester. Reaction to form the urethane is accomplished by completion of addition of the desired amount of polyol or polyester and/or chain extender (typically called a curative in methods utilizing prepolymers) with catalyst and any other additives.

Isocyanate components useful in embodiments of the present process include those based on MDI. A useful isocyanate component for use herein is BASF Elastofoam I 36470T Isocyanate having a specific gravity of 1.210 g/cc and a viscosity of 1100 cp at 77° F.

The viscosity of the outer shell material entering the mold is also important. The polymer mix for the outer shell should have a viscosity sufficiently low that it can wet all interior surfaces of the mold upon injection, e.g., the viscosity should be between about 1100 and about 2000, in embodiments between about 1100 and about 1800 cp as it enters the mold. This can be achieved using a polyol or polyester component (also referred to herein as a "resin component") having a viscosity at 77° F. between about 2000 and about 2200 cp, in embodiments between about 1700 to about 2100 cp. The viscosity of the material entering the mold is controlled herein by temperature, by use when necessary of viscosity-modifying fillers known to the art, and by type and molecular weight of the components. In embodiments hereof, a polyol component for the shell portion of the molded articles hereof is BASF Elastocast No. 70903R, Elastocast No. 70905R, or Elastocast No. 70906R resin having a specific gravity of 1.062 g/cc and a viscosity of 1120 cp at 77° F.

The "B" side (polyol or polyester) components of the polyurethane formulations can also comprise chain extenders or curatives. These materials are short chain molecules, typically glycols in MDI-based formulations.

To make the rigid shell portion of the molded article, conventional mixing procedures for mixing the polyol or polyester and isocyanate components of a polyurethane system can be used, i.e., blade mixers can be used. In embodiments, Impingement mixing is used in embodiments. In impingement mixing, the components are mixed at high pressures and flowed together into the mold. Basically, the material components are mixed by impingement in a mixing chamber of extremely small dimensions, which, at the end of the pouring process, self cleans with a mechanically driven piston. This type of mixing and cleaning eliminates the need for chemical solvents and air for cleaning the mixing chamber. An L-shaped mixing head, consisting of two cylindrical chambers of two different sizes in which two clean-out pistons operate can be used. The smaller chamber (mixing chamber), introduces the two components at high velocity, creating turbulence and impingement of the two components. The larger chamber, positioned at 90 degrees to the smaller one, is the discharge duct for the material. The material passing from the first to the second chamber completes the component mixing. The material leaving the mix-head becomes low in velocity and splash free.

When using impingement mixing for the shell components, antifoaming agents are desirable additives. Antifoaming agents known to the art can be used, such as BASF 70594 in an amount between about 0.02% and about 0.09%, in embodiments about 0.05% by weight, i.e., an amount sufficient to control bubble formation within the mix but not so great as to adversely affect the desirable physical properties of the material as discussed herein.

A catalyst or catalysts known to the art can be added to the mixture in suitable amounts, e.g., about 0.2% of the resin component, to affect the gelling profile and cure rate. Suitable catalysts are known to the art and include BASF Product No. 40850A. The type of catalyst should be one which improves the back-end cure for an accelerated cure rate in the last 25% of the total cure cycle. The type and amount of catalyst employed is adjusted to achieve a selected gelling period, typically about 2 minutes and 40 seconds after the composition enters the mold. Gelling periods of a given formulation can be assessed as known to the art.

Catalysts useful herein are organometallic catalysts, e.g., based on tin, lead or mercury. A useful catalyst herein is BASF Product No. 40850A, or BASF catalyst NB 19189-4-117-3. Catalysts are typically diluted in a carrier that is compatible with the polyurethane chemistry. A carrier useful herein is the system polyol or polyester.

Other additives such as drying agents, UV stabilizers, viscosity-controlling agents, surfactants, stabilizers, blowing agents, chain extenders, catalysts, and the like as known to the art, can also be added to bring the properties of the uncured shell mixture and cured product within the desirable parameters discussed herein. Reaction conditions can also be used to control the properties of the molded products, all as known to the art.

Before adding the foam component mix, the polymer mixture for the shell should be sticky enough to bond to the foam components.

The uncured components for the outer shell should be of uniform texture, i.e., not lumpy. The uncured components are rotated and rocked biaxially in the mold at a temperature between about 105° F. and about 115° F. until gelled (between about 2.0 and about 3.5 minutes, and in embodiments, at least about 2 minutes and 40 seconds after adding the uncured components to the mold). To achieve this short gelling time and uniform texture, the gel profile should be flat for the first two quarters of the gelling period, should start to rise during the third quarter, and rise steeply during the last quarter. The material should be in a liquid state for long enough to coat the inner mold surfaces. Too rapid gelling would result in lumps and uneven surfaces. The gelling should be as gradual as possible, consistent with the target demold time for the finished article of not more than 18 minutes, to prevent lumps, then should finish rapidly.

Rotating and rocking is continued for about 7 minutes until the inner layer of the shell has gelled sufficiently to be tacky. During the remaining time in the mold the shell material cures to sufficient hardness to be demolded, and curing can continue for outside of the mold.

The Rigid Foam Backing Layer

To make the inner rigid foam backing layer of the molded article, rocking and rotating of the mold, which is coated with the tacky shell polymer mix, is discontinued while the uncured polymer mix for the foam backing is added to the mold.

Conventional mixing procedures for mixing the polyol or polyester and isocyanate components of a polyurethane system can be used to mix the material used for the foam backing. Impingement mixing is used in embodiments. Blowing agents such as water and/or halocarbons known to the art can be part of the components of the polymer mixture or added as an auxiliary stream. Foam properties are controlled by means known to the art as well as by using a foam mixture having a density of 8-12 pounds per cubic foot, and by adjusting the isocyanate to polyol ratio so that the cure reaction proceeds at a rate that allows the best cure in the least amount of time. The blowing agents volatilize into a gas during the reaction process and fill and expand the cellular polymer matrix, creating a foam. Surfactants can be used to modify the characteristics of the polymer during the foaming process as is known to the art. Rigid foam surfactants used herein are designed to produce very fine cells and a very high closed cell content. A catalyst or catalysts known to the art can be added to the foam backing mixture in suitable amounts, e.g., about 0.2% of the resin component, to affect the gelling profile and cure rate. Suitable catalysts are known to the art. The type of catalyst should be one which improves the back-end cure for an accelerated cure rate in the last 25% of the total cure cycle. The type and amount of catalyst employed is adjusted to achieve a selected gelling period of between about 2 minutes and 40 seconds to 4 minutes after the composition enters the mold.

Catalysts useful herein for use in the foam backing mixture are organometallic catalysts, e.g., based on tin, lead or mercury. A useful catalyst herein is BASF Product No. 40850A, or BASF catalyst NB 19189-4-117-3. Catalysts are typically diluted in a carrier that is compatible with the polyurethane chemistry. A carrier useful herein is the system polyol or polyester.

Other additives can be used in the mixture for forming the foam backing layer, such as drying agents, UV stabilizers, viscosity-controlling agents, surfactants, stabilizers, blowing agents, chain extenders, catalysts, and the like as known to the art, to bring the properties of the uncured mixture and cured product within the desirable parameters discussed herein. Reaction conditions can also be used to control the properties of the molded foam backing, as known to the art and as taught herein.

The viscosity of the foam-forming material entering the mold is also important. The polymer mix for the outer shell should have a viscosity sufficiently low that it can wet all interior surfaces of the molded shell upon injection, e.g., the viscosity should be between about 300 and about 400 cp, in embodiments between about 310 and about 330 cp as it enters the mold. This can be achieved using a polyol or polyester component (also referred to herein as a "resin component") having a viscosity at 77° F., in embodiments between about 400 and about 600 cp, and in embodiments between about 500 and about 550 cp. The isocyanate component should have a viscosity at 77° F. between about 190 and about 210 cp, in embodiments about 200 cp. The viscosity of the material entering the mold is controlled herein by the temperature of the mold, ratio of the polyol to isocyanate, and type and molecular weight of the components. In embodiments hereof, the foam mixture has a density of 9 pounds per cubic foot when used herein at a ratio of isocyanate to polyol resin of 100:95, but is used at a ratio of isocyanate to polyol of about 100:82 to about 100:92, which gives it a density of about 8-12 pounds per cubic foot. Components of such foam-forming mixtures are available commercially as BASF product No. 87-B-9707 (the polyol component) and BASF 9300A (the isocyanate component).

The mixed components are added to the void volume of the hollow shell in the interior of the mold from which air has been substantially exhausted. The mold is rocked and rotated in multiple directions, as described above to substantially coat the inside of the cured polymer shell with the foam backing material to a depth between about ⅜ and ¾ inch, and rotation and rocking of the mold is continued until the shell is cured enough to be removed from the mold. The finished molded article is demolded and both the shell and foam layers can continue to cure after demolding.

Properties of the Finished Articles

The outer shell of the molded articles, the inner foam backing layer, and the molded articles as a whole should have desirable properties discussed below, achieved by methods taught herein and/or through routine optimization by those skilled in the art of polyurethane chemistry.

The molded articles are lighter in weight than previous hollow molded articles having the same structural rigidity. For example, a typical manikin made by previous methods not using a polymeric foam backing weighs about 19 pounds, while the same size manikin as made by the process described herein weighs about 16 pounds.

The outer shell of the finished articles typically has a Shore D hardness of about 70D or more when tested by ASTM D 2240.

The outer shell should have a uniform selected color throughout the thickness of the material. The term "uniform" with respect to the selected color(s) of the form material means that the color does not appear different to the eye inside the material, if the material is chipped, cut or broken, than on the molded surface. In embodiments, the color also does not appear different to the eye on different portions of the surface.

The brittleness of the outer shell should be such that arms, legs, fingers and other body parts of molded manikins do not break during shipping and use. In embodiments the materials have a high Izod Impact energy as measured by ASTM D 256-97 (Method A) at 75 degrees F. exceeding about 2 ft. lb./inch, in embodiments between about 2 and about 3 ft. lb./inch, and in embodiments, at least about 2.40 ft. lb./inch, and in embodiments, at least about 2.75 ft. lb./inch. A TUP impact exceeding 180 ft. lb. using a twelve-pound weight as measured by ASTM D 2444 is also desirable. Manikins made by the methods described herein have been tested and found not to crack when hit with a ten-pound hammer swung at a velocity of about 10 meters per second.

The molded articles should not deform under load (especially under their own weight) at high temperatures, so as to be able to withstand such shipping conditions as being kept in a truck container in the summer, or being displayed in a showroom window during hot weather. For example, the molded articles should not visibly sag, wrinkle, or have the parts fuse together, at temperatures up to about 120 to 160° F., in embodiments up to about 140° F.; and in embodiments should resist deforming when thumb pressure is applied at temperatures of about 170° F. to about 185° F. for at least about 72 hours.

The molded articles should also be resistant to denting under normal use, i.e., they should exhibit resilience when deformed flexurally by 5% of the material thickness at 110° F. as measured by ASTM D 790-99. They are, in embodiments, resistant to denting at 100° F. and have a flexural stress value of at least about 800 psi at deflections of 5% of their thickness. They should have a flexural modulus between about 50,000 and about 500,000 psi, in embodiments between about 50,000 and about 100,000, at room temperature (73° F.) as measured by ASTM D 790-99, and should have a flexural modulus at 110° F. between about 20,000 and about 60,000 psi.

In embodiments, the molded articles are relatively inflammable, and have a linear burn rate of no more than about 40 mm/minute, and in embodiments no more than about 20 to about 25 mm/minute as measured by ASTM D 635-98.

Heat cycling of the molded articles should not cause dimensional changes. There should be less than about 0.5%, and in embodiments less than about 0.2%, change in dimensions of molded parts when the material is maintained at 120° F. for 21 days, or cycled between 32° F. and 120° F. every twelve hours for 21 days.

The outer surfaces of the molded articles should be abrasion resistant, but are, in embodiments, soft enough to be readily abradable by hand using sandpaper to remove seams (also referred to herein as "flash"). If coarse sandpaper is used to remove flash, unsightly scratches can occur. Using materials described herein that have uniform coloration throughout the thickness of the material (as described in U.S. Patent Publication No. 2005/0184422, incorporated herein by reference) makes the buffed seam substantially invisible. A synthetic buffing pad such as a 3M Scotchbrite™ pad can then be used if necessary to restore matte finish where the flash has been sanded off. As is known in the art, seams can be reduced or eliminated by lowering the pressure within the mold and/or ensuring better fitment between the mold pieces. In other embodiments, when unwanted flash material is present, it can be removed by means known to the art such as cutting, sanding, sandblasting and the like. Such methods leave a different texture where the unwanted material has been removed, and the surface can then be treated to provide a uniform surface, e.g. by sanding or by use of a scraping tool. In an embodiment hereof using material responsive to surface modification with sandpaper of 100 grit or finer, which material can be buffed by hand to a uniform matte finish, e.g. using a 3M Scotchbrite™ pad, more expensive sanding and/or coating steps can be dispensed with, especially when the outer shell polymer has a uniform color throughout. Abrasion resistance can be controlled by using polymer shell mixtures with higher polyol or polyester to isocyanate ratios when a softer molded article is desired.

The molded articles for display should resist discoloration as a result of ultraviolet (UV) light or high temperatures in indoor service environments exposed to a spectrum of sunlight through window glass and the emissions of fluorescent and incandescent lighting lamps for up to at least about two years, in embodiments at least about five years. Ultraviolet-stable means minimal degradation of materials when exposed to sunlight (especially ultraviolet), and high temperatures. In embodiments, any change in color should be less than one or two shades (a shade being a difference detectable by the human eye) over a one to three year period, and in embodiments over a five-year period. Such materials should have a total difference (DE) on the CIE L*a*b* scale of less than about 12 over a period of one year under normal show window conditions, e.g., exposed to sunlight through glass. The UV stability can be controlled by use of UV-stabilizing compounds as known to the art.

FIG. 1 is a perspective cutaway view of a hollow, molded manikin arm 10 showing rigid polymer shell 12 and rigid foam backing 14, defining an interior void 18. Fingers 16 have a narrow interior space 20 that is entirely filled by foam backing material.

Figure 2:
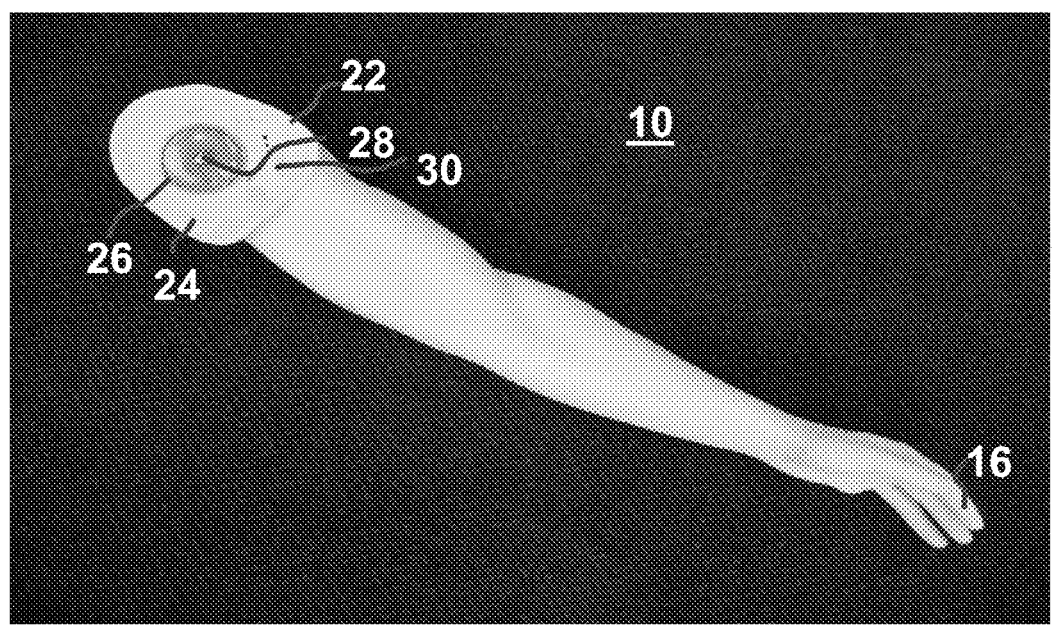
FIG. 2 is a perspective view of the opposite side of the manikin arm shown in FIG. 1 having a flattened upper arm joint.

FIG. 2 is a perspective view of the opposite side of manikin arm 10 shown in FIG. 1, with the flat surface 24 of upper arm joint 22 shown. A magnetic fitting 26 and index pin are 28 fixedly attached to flat surface 24. Vent holes 30 are provided to allow inflow and outflow of air as necessary to accommodate changes in altitude without damage to the hollow, molded arm 10.

Figure 3:
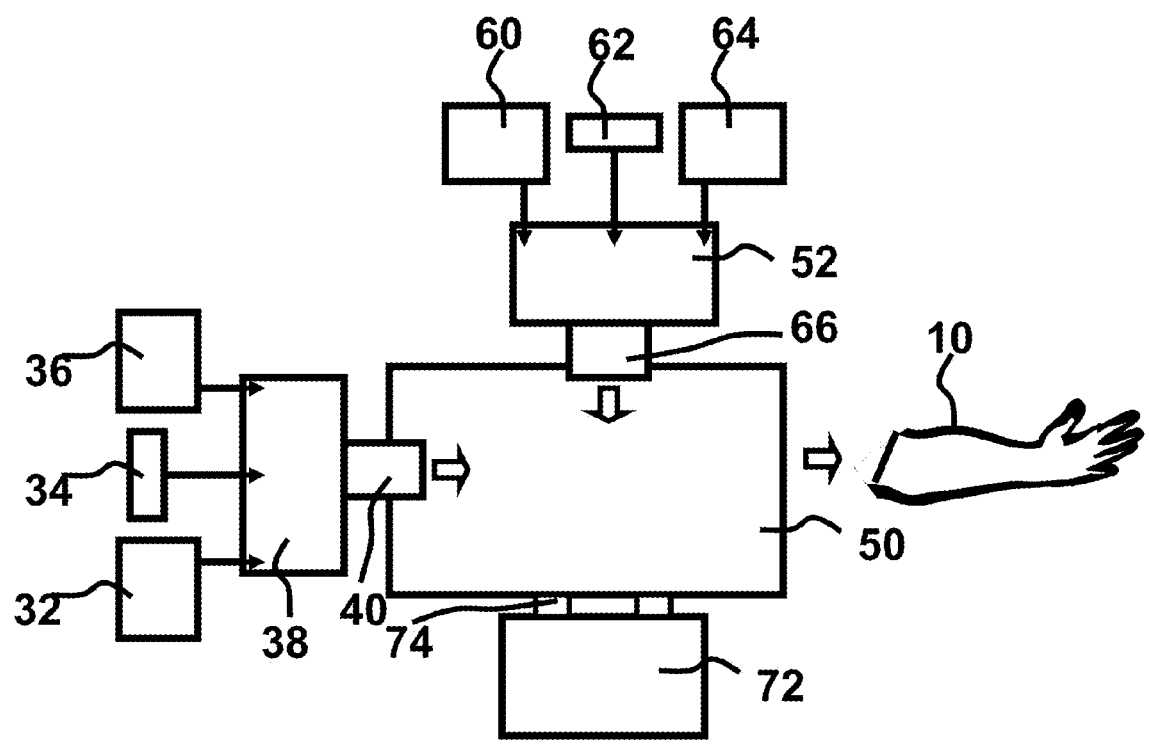
FIG. 3 is a block diagram showing the steps of the process hereof for making foam-backed molded articles.

FIG. 3 is a block diagram showing the system and process provided herein for making foam-backed molded articles. The system comprises a shell polyol dispenser 32 and a shell isocyanate dispenser 36 in fluid communication with shell component mixer 38. In operation, the polyol component for the shell is dispensed into shell component mixer 38 from shell polyol dispenser 32. The catalyst is also contained in shell polyol dispenser 32. Other additive components for the shell can be dispensed into shell component mixer 38 from other dispenser(s) 34 or can be added to the polyol dispenser 32. The isocyanate component for the shell is dispensed into shell component mixer 38 from shell isocyanate dispenser 36. The shell components in proportions defined herein and otherwise as known to the art, are mixed in shell component mixer 38. The system also comprises a foam polyol dispenser 60 containing the foam polyol component and also containing a foam catalyst, and a foam isocyanate dispenser 64, both in fluid communication with foam component mixer 52. In operation, the polyol and catalyst components for the foam are dispensed into foam component mixer 52 from foam polyol dispenser 60. Other additives may also be added to the foam polyol dispenser, or may be dispensed from separate dispenser(s) 62. The isocyanate component for the foam is dispensed into foam component mixer 52 from foam isocyanate dispenser 64. The foam components are added to mixer 52 in proportions that will produce a ratio of isocyanate to polyol of about 100:87, which produces a mixture having a density of about 8-12 pounds per cubic foot.

The system also comprises a mold 50, operationally connected to rotation device 72 via rotation means 74 known to the art for rocking and rotating rotational mold 50. In operation, the mixed shell components in shell component mixer 38 are injected through mix head 40 under pressure into rotational mold 50, and rocked and rotated therein by activation of the rotation means 74 of rotation device 72 until substantially all the inside surface of mold 50 is coated to an average depth of about ⅛ to about ¼ inch. The rocking and rotation is continued until the inner surface of the coating has become tacky. The rotation device 72 is then deactivated, and the uncured polymer mix for the foam backing is added.

The mixed foam components in foam component mixer 52 are then injected through foam nozzle 66 into rotational mold 50 under pressure and rocked and rotated therein by activation of the rotation means 74 of rotation device 72 at room temperature until substantially all the inside surface of the shell is coated to an average depth of about ⅜ to ¾ inch. The rocking and rotation is continued until the outer shell components have cured enough to allow demolding. The rotation device 72 is then deactivated, and the rotational mold 50 is opened, and the molded article 10 removed.

Figure 4:
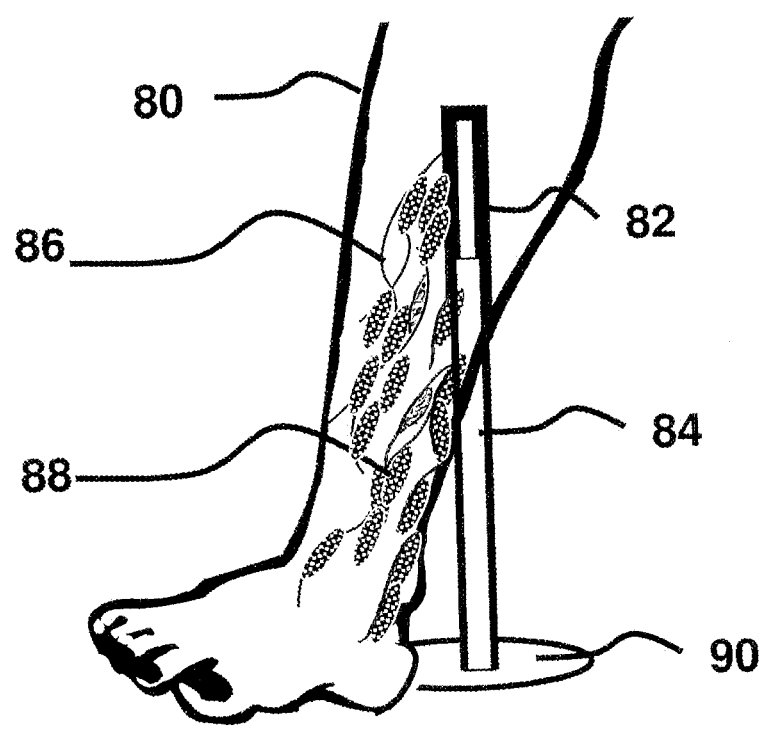
FIG. 4 is a drawing of a manikin foot and lower leg showing the use of a foam buildup-inducing component.

FIG. 4 shows a molded manikin leg 80 (shown as transparent) having a tube 82 molded into it, into which a shaft 84 of a supporting stand 90 is inserted. Foam buildup-inducing components 86 in the form of metal straps are attached to tube 82 and induce turbulence and extra foam buildup 88 inside the leg 80 during the molding process to add extra support to the manikin. The metal straps used as the foam buildup-inducing components are, in an embodiment, about ¾ inches wide by about 0.020 inches thick. They are allowed to remain inside the molded article after demolding. The tube and shaft in embodiments have a square cross-section. Tube 82 is, in embodiments, positioned inside the mold before the polymers are added, and is capped to prevent polymer material from filling into it. In embodiments, the foam buildup-inducing components are attached before the polymers are added.

EXAMPLES

Full size manikins in female human shape were produced in accordance with the above description using E-Flex™ polyurethane polymer, Fusion Specialties, Inc., Broomfield, Colo., described in PCT Patent Publication WO 2002089092) for the shell and for the foam, a urethane polymer mix containing BASF product No. 87-B-9707 as the polyol component and BASF 9300A as the isocyanate component, at a ratio of isocyanate to polyol of 100:87. Results are shown in Table 1.

TABLE 1

Comparison of Weight in Pounds of Prior Art Manikins with Foam-Backed Manikins

| Test No. | E-flex Polymer Mix | Fittings | Foam Polymer Mix | Total Component Weight |
|---|---|---|---|---|
| 1 (Prior Art) | 15.98 | 2.21 | | 18.19 |
| 2 (Prior Art) | 15.16 | 2.21 | | 17.39 |
| Avg. Weight (Prior Art) | | | 17.79 | |
| 3 | 9.36 | 0.81 | 4.4 | 14.57 |
| 4 | 9.36 | 0.81 | 4.4 | 14.57 |
| 5 | 9.19 | 0.81 | 4.4 | 14.4 |
| 6 | 10.29 | 0.81 | 5 | 16.1 |
| 7 | 9.21 | 0.81 | 4.4 | 14.42 |
| 8 | 10.05 | 0.81 | 4.4 | 15.26 |
| 9 | 9 | 0.81 | 4.4 | 14.21 |
| 10 | 9.24 | 0.81 | 4.1 | 14.15 |
| 11 | 10.6 | 0.81 | 4.72 | 16.13 |
| 12 | 9.31 | 0.81 | 4.4 | 14.52 |
| 13 | 9.19 | 0.81 | 4.4 | 14.4 |
| 14 | 9.36 | 0.81 | 4.4 | 14.57 |
| 15 | 9.09 | 0.81 | 4.4 | 14.3 |
| 16 | 9.3 | 0.81 | 4.4 | 14.51 |
| 17 | 10.25 | 0.81 | 4.7 | 15.76 |
| 18 | 9.79 | 0.81 | 4.9 | 15.5 |
| 19 | 10.95 | 0.81 | 5.1 | 16.86 |
| 20 | 9.5 | 0.81 | 4.4 | 14.71 |
| 21 | 8.39 | 0.81 | 4.4 | 13.6 |
| 22 | 10.88 | 0.81 | 5.1 | 16.79 |
| 23 | 9.97 | 0.81 | 4.4 | 15.18 |
| 24 | 9.34 | 0.81 | 4.4 | 14.55 |
| 25 | 9.43 | 0.81 | 4.4 | 14.64 |
| 26 | 9.21 | 0.81 | 4.4 | 14.42 |
| 27 | 9.4 | 0.81 | 4.4 | 14.61 |
| 28 | 9.37 | 0.81 | 4 | 14.18 |
| 29 | 9.33 | 0.81 | 4.4 | 14.54 |
| 30 | 9.23 | 0.81 | 4.2 | 14.24 |
| 31 | 9.25 | 0.81 | 4.4 | 14.46 |
| 32 | 9.81 | 0.81 | 4.8 | 15.42 |
| Avg. Wt. (This Invention) | | | 14.85 | |

The results show that the manikins provided herein are about three pounds lighter than prior art manikins with comparable properties not containing a foam backing. The manufacturing costs of the foam-backed manikins were also compared with manufacturing costs for prior art manikins without the foam backing, showing that significant cost savings were realized in manufacture of the foam-backed manikins compared with the prior art manikins.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method for making a hollow molded article that is resistant to heat and impact distortion, said method comprising:
   a. introducing a first polymer mix containing uncured thermosetting polymer components for a rigid, hollow polymer shell into a mold in an amount sufficient to form a shell coating of said first polymer mix on the inside surface of the mold;

b. rocking and rotating the mold in multiple directions in a cold rotational molding process to form said shell coating until at least the inner surface of said coating has become tacky;

c. introducing said second polymer mix into the mold in an amount sufficient to form a foam coating on said shell coating;

d. rocking and rotating the mold at room temperature to about 115° F. in multiple directions to form said foam coating bonded to said shell coating and allow said shell coating to cure sufficiently that a molded hollow article made by the foregoing method can be removed from the mold; and e. removing the molded article consisting essentially of an outer shell layer bonded to an inner foam backing layer from the mold.

2. The method of claim 1 wherein said first polymer mix, for said rigid shell, is introduced into said mold in an amount at least sufficient to form a coating about ⅛ inch to about ¼ inch thick on the inner surface of said mold.

3. The method of claim 1 wherein said second polymer mix, for said foam coating, is introduced into said mold in an amount at least sufficient to form a coating about ⅜ inch to about ¾ inch thick on the inner surface of said shell.

4. The method of claim 1 performed at a temperature within the mold sufficient to maintain the first and second polymer mixes at viscosities low enough to form said coatings.

5. The method of claim 1 which is completed in at most about 18 minutes.

6. The method of claim 1 wherein the first and second uncured polymer mixes comprise polyol or polyester resin, isocyanate, and a curing catalyst.

7. The method of claim 6 wherein first mix, for the polymer shell, has an isocyanate to polyol ratio of about 77:100.

8. The method of claim 6 wherein the second mix, for the rigid polymer foam coating, has an isocyanate to polyol ratio of between about 100:82 and about 100:92.

9. The method of claim 6 wherein the second mix, for the rigid polymer foam coating, has an isocyanate to polyol ratio of about 100:87.

10. The method of claim 6 wherein the uncured polymer components for the shell coating also comprise a pigment or dye effective to produce a desired color of said shell.

11. The method of claim 6 wherein the uncured polymer components for the foam coating also comprise a pigment or dye effective to produce a desired color of said foam backing.

12. The method of claim 1 wherein the mold comprises complex curved surfaces.

13. The method of claim 12 wherein the mold also comprises a flat surface.

14. The method of claim 13 wherein said method also comprises attaching a magnetic component to a flat surface of a molded article made by said method.

15. The method of claim 1 wherein the mold comprises one or more foam buildup-inducing components.

16. The method of claim 15 wherein the foam backing of the molded article comprises areas having greater than average thickness produced by the turbulence induced by the foam buildup-inducing component(s).

17. The method of claim 1 also comprising providing a vent hole in the molded article.

18. The method of claim 1 wherein the mold does not contain an internal armature.

19. The method of claim 1 wherein the mold is a mold for a manikin or a manikin part.

20. The method of claim 1 wherein the mold is sized and shaped to produce a molded article having the size and shape of a normal human body or body part.

21. The method of claim 1 wherein said first and second polymer mixes are polyurethane polymer mixes.

* * * * *